W. O'BRIEN.
MICROMETER GAGE.
APPLICATION FILED JULY 26, 1912.

1,111,030.

Patented Sept. 22, 1914.

Witnesses
Philip S. McLean.
Teresa V. Lynch.

Inventor:
William O'Brien
by Andrew Becker
his Attorney

UNITED STATES PATENT OFFICE.

WILLIAM O'BRIEN, OF LONDON, ENGLAND.

MICROMETER-GAGE.

1,111,030.

Specification of Letters Patent. Patented Sept. 22, 1914.

Application filed July 26, 1912. Serial No. 711,751.

*To all whom it may concern:*

Be it known that I, WILLIAM O'BRIEN, a subject of the King of Great Britain and Ireland, and residing at 48 Derby road, Ponders End, in the county of London, England, have invented certain new and useful Improvements in Micrometer-Gages, of which the following is a specification.

This invention relates to improvements in micrometer gages of the kind in which measurements may be made in a plurality of scales.

It has previously been proposed to construct a micrometer gage by means of which the required dimensions of an object could be read off in either of two different scales of length, the method adopted, however, involving the use of a second moving member in addition to the ordinary rotary tube or sleeve.

The present invention has for its object to overcome this disadvantage and consists in a micrometer gage comprising a stationary member upon which is engraved or otherwise suitably marked a plurality of scales and a single rotary member having a corresponding number of suitably calibrated scales thereon.

The accompanying drawings illustrate one mode of carrying out the invention when producing a micrometer gage capable of dealing with measurements to two different scales.

Figure 1:
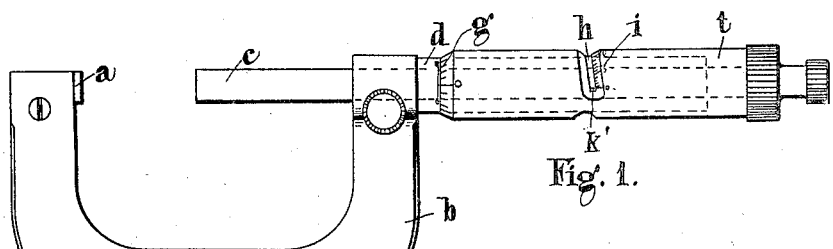
Figure 2:
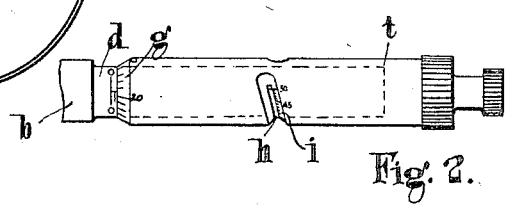
Figure 3:
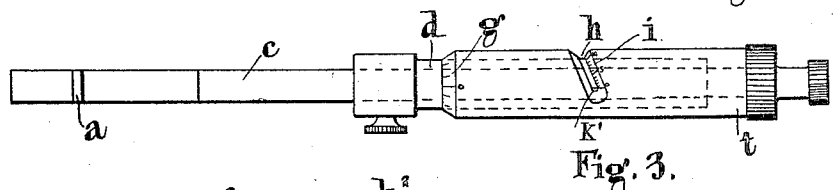
Figure 4:
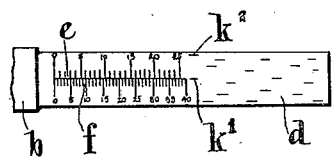

Figure 1 is an elevation showing one convenient form of outside micrometer gage constructed in accordance with my invention. Fig. 2 is a portion of a similar view illustrating a detail. Fig. 3 is a plan of the gage in the position shown in Fig. 1, the reading tube of the micrometer being shown in a position corresponding to that shown in Fig. 2. Fig. 4 is a view illustrating a portion of the gage.

In carrying my invention into effect in one convenient manner as, for example, in its application to an outside micrometer gage capable of dealing with measurements of length to two different scales, I may employ the usual stop $a$ upon a U block $b$ through the other limb of which passes a rod $c$ screwed or threaded for a portion of its length and adapted to engage an internally threaded sleeve $d$, the rod $c$ being connected with a reading tube or sleeve $t$ surrounding the stationary member $d$. The latter is provided with two scales $e$ $f$ calibrated according to the two units of lengths that are to be employed and the reading tube $t$ is provided with the usual scale $g$ adapted to coöperate with the scale $e$ for making measurements according to the latter scale in the usual way. The reading tube $t$ is made longer than is usual and is provided with a slot $h$ at a convenient point in its length through which the inner stationary member $d$ may be seen and a scale $i$ properly calibrated according to the unit of the scale $f$ is provided on the portion of the reading tube adjacent to the slot $h$.

Assuming as an example that the scales to be employed are in English and metric units respectively and that the micrometer gage is required to measure to thousandths of an inch and hundredths of a millimeter the pitch of the travel screw may conveniently be such that there are forty threads to the inch while the scale $g$ contains twenty-five divisions so that rotation of the reading tube $t$ through one such division causes the rod $c$ to be moved through one-thousandth of an inch.

The manner of constructing the scale $i$ and of adapting the micrometer gage to read in hundredths of a mm. in the metric scale is as follows: With the gage in its zero position as shown in Fig. 1 a mark $k^1$ in alinement with the zero line of the scales $e$ and $f$ is formed on that part of the stationary member $d$ exposed by the slot $h$, the zero mark scale $i$ also being in register with the mark $k^1$. The scale $i$ occupies such a proportion of the circumference of the reading tube $t$ that rotation of the latter through the length of the scale $i$ causes the rod $c$ to move through a distance equal to $\frac{1}{2}$ mm. and the scale is conveniently divided into fifty divisions as shown. The reading tube is now moved from the position shown in Fig. 1 to that shown in Fig. 2 so that the mark 50 on the scale $i$ comes into register with the mark $k^1$ on the member $d$ and a second mark $k^2$ is now made on the member $d$ opposite the zero mark on the scale $i$ as shown in Fig. 3. Since the distance between the marks 0 and 50 on the scale $i$ represents a travel of the rod $c$ of $\frac{1}{2}$ mm. and the scale is divided into fifty equal divisions it follows that when the reading tube $t$ is rotated so that the mark $o$ moves from the mark $k^1$ the number of divisions through which it is moved is a measure of the travel of the rod $c$ in hundredths of a millimeter. When, however, the rod $c$ is moved through $\frac{1}{2}$ mm. the zero mark on the scale $i$ will now be opposite the mark $k^2$ on the member $d$, which latter mark is to be used as the index mark for the scale $i$ until the 50 division is in register with the mark $k^2$ when a new mark is formed on the member $d$ opposite the zero of the scale $i$ and so on until as many marks of the scale $i$ and so on until as many marks $k^1$, $k^2$, $k^3$ etc. are made upon the member $d$ as are required. These marks should be so proportioned and positioned that not more than one of them is uncovered at the same time and for the same reason the slot $h$ should be formed as a helix having an inclination equal to that of the thread of the travel screw.

It is obvious that the marks $k^1$, $k^2$ etc. need not necessarily be marked off by means of the tube $t$ and scale $i$ as this operation can conveniently be avoided by means of a lathe or other suitable machine having a dividing head and leading screw, and moreover I do not limit myself to any particular form of micrometer gage to which my invention is to be applied nor to any particular number of scales with which it is to be employed as these and other details may be suitably modified to suit varying requirements.

Having now described my invention what I claim as new and desire to secure by Letters Patent is:—

1. A micrometer gage comprising a stationary member upon which is engraved or otherwise suitably marked a plurality of scales each of which corresponds to a different unit of measurement, and a single rotary member having a corresponding number of scales thereon calibrated in such a manner that each scale corresponds to the unit adopted for the corresponding scale upon the stationary member, the latter being provided with a number of zero register marks for one of the scales upon the movable member.

2. A micrometer gage comprising a stationary member upon which is engraved or otherwise suitably marked a plurality of scales each of which corresponds to a different unit of measurement, and a single rotary member having a corresponding number of beveled edges thereon on each of which is marked a scale calibrated in such a manner as to correspond to the unit adopted for the corresponding scale upon the stationary member, the latter being provided with a number of zero register marks for one of the scales upon the movable member.

3. A micrometer gage comprising a stationary member upon which are engraved or otherwise suitably marked two scales each of which corresponds to a different unit of measurement, and a single rotary member also having two scales thereon calibrated in such a manner as to correspond to the unit adopted for the corresponding scale upon the stationary member, the latter having a number of zero register marks for one of the scales upon the movable member.

4. A micrometer gage comprising a stationary member upon which are engraved two scales each of which corresponds to a different unit of measurement and a single rotary member surrounding the stationary member and having its forward edge beveled with a scale marked thereon to suit the unit adopted for one scale upon the stationary member, and a spiral slot also formed with a beveled edge upon which is marked a scale corresponding to the unit adopted for the other scale upon the stationary member, the latter being provided with a number of zero register marks for the scale marked upon the spiral slot.

In testimony whereof I have signed my name to this specification in the presence of two subscribing witnesses.

WILLIAM O'BRIEN.

Witnesses:
O. J. WORTH,
R. WESTACOTT.

Copies of this patent may be obtained for five cents each, by addressing the "Commissioner of Patents, Washington, D. C."